United States Patent
Ota

(10) Patent No.: US 8,994,774 B2
(45) Date of Patent: Mar. 31, 2015

(54) PROVIDING INFORMATION TO USER DURING VIDEO CONFERENCE

(71) Applicant: Sony Corporation, Tokyo (JP)

(72) Inventor: Takaaki Ota, San Diego, CA (US)

(73) Assignee: Sony Corporation, Tokyo (JP)

( * ) Notice: Subject to any disclaimer, the term of this patent is extended or adjusted under 35 U.S.C. 154(b) by 62 days.

(21) Appl. No.: 13/956,581

(22) Filed: Aug. 1, 2013

(65) Prior Publication Data

US 2015/0035937 A1 Feb. 5, 2015

(51) Int. Cl.
*H04N 7/14* (2006.01)
*H04N 7/15* (2006.01)

(52) U.S. Cl.
CPC .......................................... *H04N 7/15* (2013.01)
USPC ....................................................... 348/14.01

(58) Field of Classification Search
USPC .................... 348/14.02, 14.01; 455/563, 566; 704/270, 275
See application file for complete search history.

(56) References Cited

U.S. PATENT DOCUMENTS

| | | | |
|---|---|---|---|
| 6,073,033 A * | 6/2000 | Campo | 455/566 |
| 2013/0176377 A1* | 7/2013 | Ho | 348/14.02 |
| 2014/0222427 A1* | 8/2014 | Moore | 704/246 |

* cited by examiner

*Primary Examiner* — Stella Woo
(74) *Attorney, Agent, or Firm* — John L. Rogitz; John M. Rogitz

(57) ABSTRACT

A consumer electronics (CE) device is configured to execute a conferencing application for a user to audibly communicate with at least one other person at least through a first audible input configuration configured for providing audio from the user to the other person. While executing the conferencing application, the CE device receives an audible input configuration command to change from the first audible input configuration to a second audible input configuration that is configured to not provide audio from the user to the other person and is also configured for receiving audible CE device commands from the user. In the second audible input configuration, the CE device thus receives audible commands from the user to either access information and provide the information to the user, and/or to initiate a note taking feature that converts audio from the user to text for viewing of the text on the CE device.

20 Claims, 5 Drawing Sheets

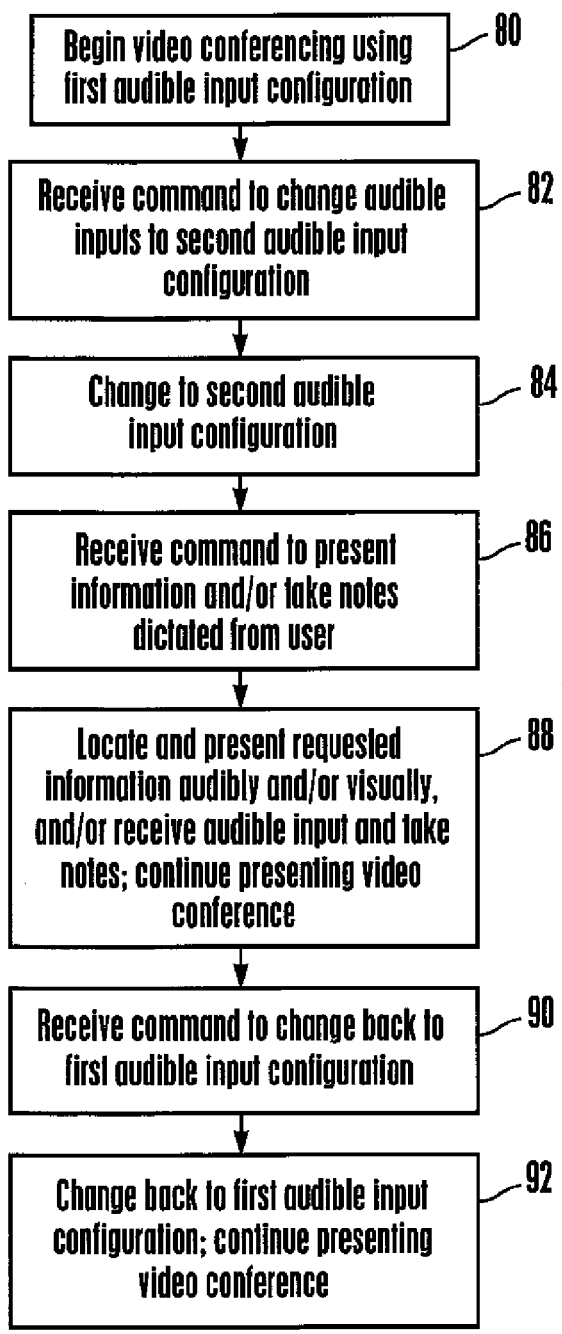
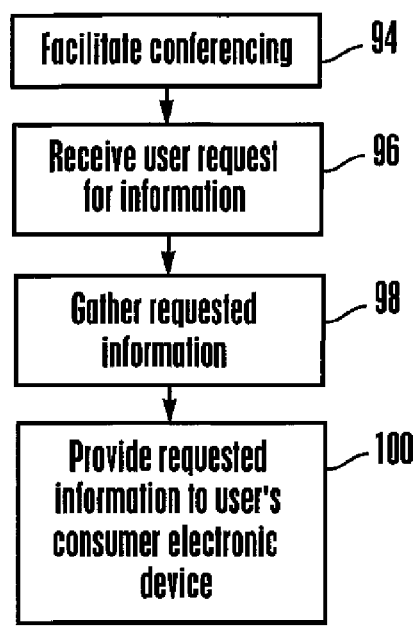

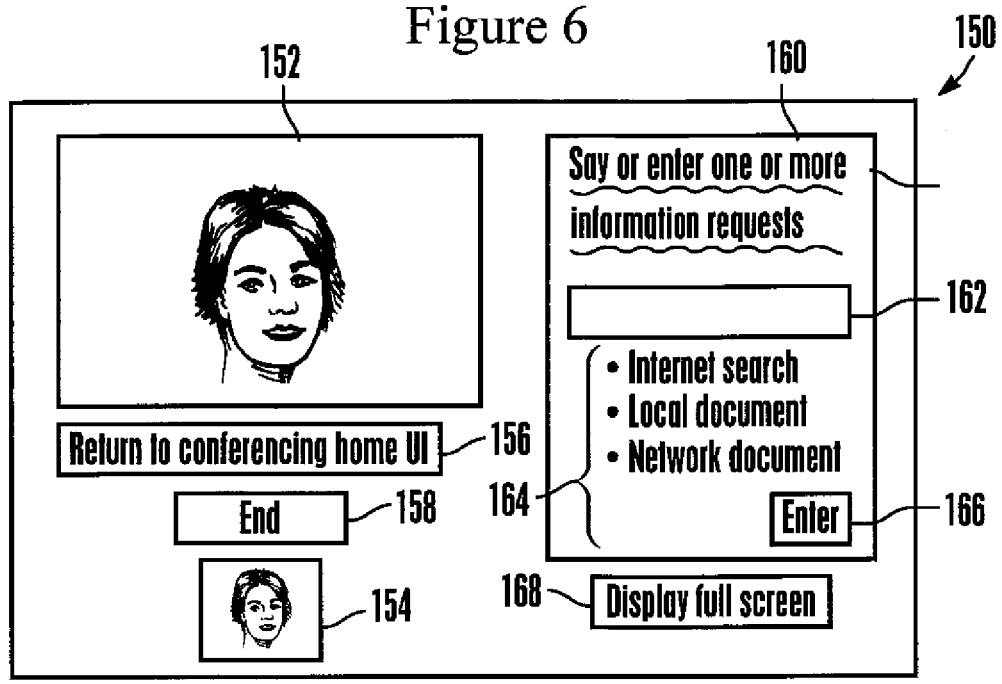
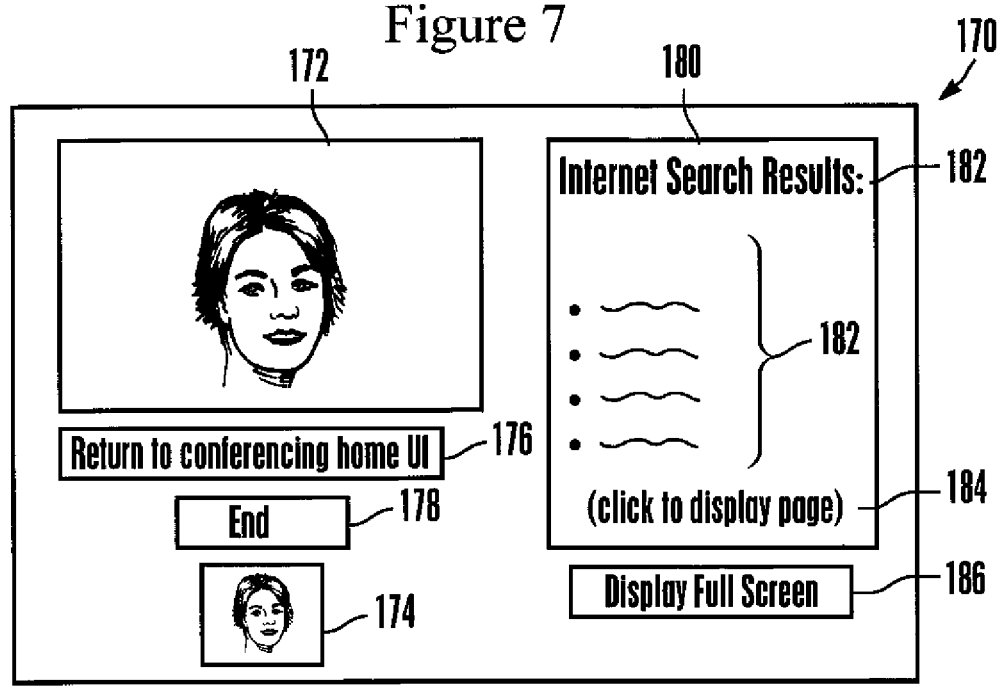

PROVIDING INFORMATION TO USER DURING VIDEO CONFERENCE

FIELD OF THE INVENTION

The present application relates generally to conferencing over consumer electronics (CE) devices.

BACKGROUND OF THE INVENTION

Conferencing using consumer electronics (CE) devices continues to increase in prevalence. Furthermore, not only has conferencing increased in prevalence, but so has its use while "on the go" in the sense that many users desire to engage in conferencing while participating in other tasks and outside the typical desk and/or office environment. For example, a user may wish to conference while walking, exercising, driving, eating, etc. However, conferencing in such situations often proves difficult when the need arises to take notes during the conference and/or access electronic information useful for the conference, such as, e.g., word processing documents, spreadsheets, diagrams, the Internet, etc. Indeed, even when information is accessible over the CE device being used by a person to participate in conferencing, the environment in which the user is disposed may not be optimal for accessing the information on the CE device while simultaneously conferencing. For example, while driving it may be possible to conference but not take one's hands off the steering wheel to manipulate the CE device to access a document useful for the conference.

SUMMARY OF THE INVENTION

Accordingly, in one aspect, a consumer electronics (CE) device includes a display, a processor configured for controlling the display, and at least one computer readable storage medium that is not a carrier wave and that is accessible to the processor. The computer readable storage medium bears instructions which when executed by the processor cause the processor to execute a conferencing application on the CE device. The conferencing application is configured for a user of the conferencing application to at least audibly communicate with at least one other person using the conferencing application at least through a first audible input configuration, where the first audible input configuration is configured for providing audio from the user to the other person using the conferencing application. The instructions also cause the processor to, at least while executing the conferencing application, receive an audible input configuration command from the user to change from the first audible input configuration to a second audible input configuration. The second audible input configuration is configured to not provide audio from the user to the other person using the conferencing application and is also configured for receiving audible CE device commands from the user. In addition, the instructions cause the processor to receive, from the user over the second audible input configuration, at least one audible command at the CE device. The audible command causes the processor to access information and provide the information to the user, and/or causes the processor to initiate a note taking feature of the CE device. The note taking feature is configured for converting audio from the user received at least over the second audible input configuration to text for viewing on the display of the CE device.

In some exemplary embodiments, the information may at least include textual information, and subsequent to receiving the command the information may be provided audibly on the CE device using text to speech conversion software. However, present principles recognize that in some embodiments, the information may be provided audibly and visually on the CE device. Moreover, in some embodiments the conferencing application may be a video conferencing application that is configured to visually present an image of the at least one other person on the CE device while the information is provided to the user, and/or at least while the note taking feature converts the audio from the user received over the second audible input configuration to text for viewing on the display.

Furthermore, in exemplary embodiments the audible input configuration command may be received at least based on configuration of a physical switch located on the CE device, based on receipt of an audible command to change from the first audible input configuration to the second audible input configuration, and/or based on input directed to an audible input configuration selector element presented on a touch-enabled display of the CE device. Also in exemplary embodiments, the commands may be executed by the processor after being recognized as commands using voice-based natural language recognition technology.

In another aspect, a method includes executing a conferencing application on a consumer electronics (CE) device and, in response to a command received at the CE device while the conferencing application is executing from a user of the CE device, presenting information requested by the user on the CE device, the information requested at least partially based on the command.

In yet another aspect, a computer readable storage medium that is not a carrier wave bears instructions which when executed by a processor of consumer electronics (CE) device configure the processor to execute logic including executing a conferencing service on the CE device, where the conferencing service is configured at least for facilitating audio conferencing between a user of the CE device and at least one conferee, and receiving a first command at the CE device while the conferencing service is executing. The logic also includes, in response to receiving the first command, changing audible input configurations of the CE device from a first audible input configuration to a second audible input configuration. The first audible input configuration is at least configured for providing audio from the user to the conferee over the conference service. The second audible input configuration is at least configured for receiving requests for information. Furthermore, the second audible input configuration is configured to prohibit audio from the user from being provided to the conferee. The logic additionally includes receiving a second command at the CE device while the conferencing service is executing and, in response to receiving the second command, changing audible input configurations from the second audible input configuration to the first audible input configuration.

The details of the present invention, both as to its structure and operation, can best be understood in reference to the accompanying drawings, in which like reference numerals refer to like parts, and in which:

BRIEF DESCRIPTION OF THE DRAWINGS

FIG. 2 is an exemplary flowchart of logic to be executed by a CE device to execute a conferencing application and provide requested information to a user of the conferencing application;

FIG. 3 is an exemplary flowchart of logic to be executed by a server to facilitate conferencing and requests for information in accordance with present principles; and FIGS. 4-9 are exemplary user interfaces (UIs) presentable on a CE device while executing a conferencing application in accordance with present principles.

DETAILED DESCRIPTION OF THE PREFERRED EMBODIMENT

Figure 1:
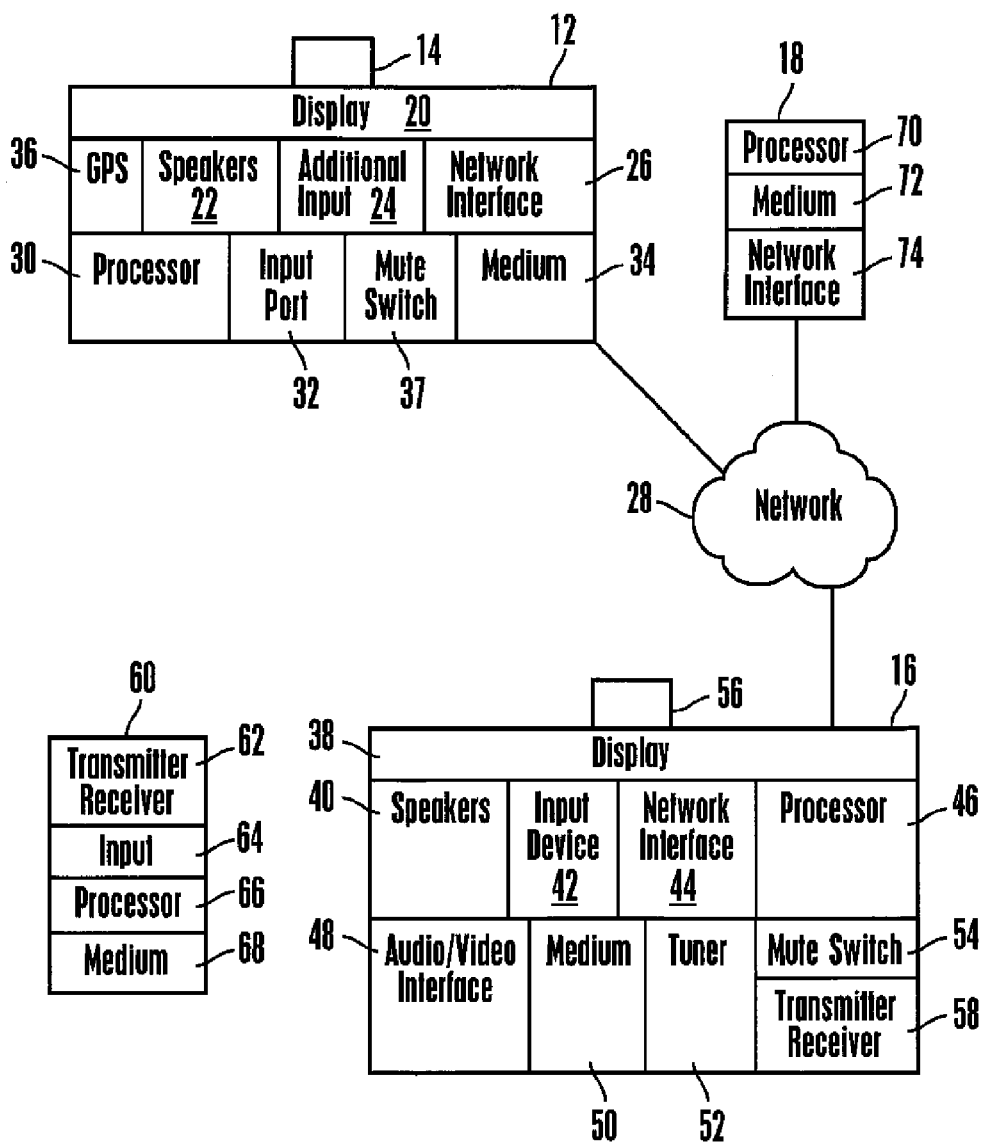
FIG. 1 is a block diagram of an exemplary system including plural CE devices in accordance with present principles.

Disclosed are methods, apparatus, and systems for computer based user information. A system herein may include server and client components, connected over a network such that data may be exchanged between the client and server components. The client components may include one or more computing devices. These may include personal computers, laptops, tablet computers, and other mobile devices including smart phones. These client devices may operate with a variety of operating environments. For example, some of the client computers may be running Microsoft Windows® operating system. Other client devices may be running one or more derivatives of the Unix operating system, or operating systems produced by Apple® Computer, such as the IOS® operating system, or the Android® operating system, produced by Google®. While examples of client device configurations are provided, these are only examples and are not meant to be limiting. These operating environments may also include one or more browsing programs, such as Microsoft Internet Explorer®, Firefox, Google Chrome®, or one of the other many browser programs known in the art. The browsing programs on the client devices may be used to access web applications hosted by the server components discussed below.

Server components may include one or more computer servers executing instructions that configure the servers to receive and transmit data over the network. For example, in some implementations, the client and server components may be connected over the Internet. In other implementations, the client and server components may be connected over a local intranet, such as an intranet within a school or a school district. In other implementations a virtual private network may be implemented between the client components and the server components. This virtual private network may then also be implemented over the Internet or an intranet.

The data produced by the servers may be received by the client devices discussed above. The client devices may also generate network data that is received by the servers. The server components may also include load balancers, firewalls, caches, and proxies, and other network infrastructure known in the art for implementing a reliable and secure web site infrastructure. One or more server components may form an apparatus that implement methods of providing a secure community to one or more members. The methods may be implemented by software instructions executing on processors included in the server components. These methods may utilize one or more of the user interface examples provided below in the appendix.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, processor-based systems, programmable consumer electronics, network PCs, mini-computers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor such as the AMD® Athlon® II or Phenom® II processor, Intel® i3®/i5®/i7® processors, Intel Xeon® processor, or any implementation of an ARM® processor. In addition, the processor may be any conventional special purpose processor, including OMAP processors, Qualcomm® processors such as Snapdragon®, or a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. The description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be written in any conventional programming language such as C#, C, C++, BASIC, Pascal, or Java, and run under a conventional operating system. C#, C, C++, BASIC, Pascal, Java, and FORTRAN are industry standard programming languages for which many commercial compilers can be used to create executable code. The system may also be written using interpreted languages such as Pert Python or Ruby. These are examples only and not intended to be limiting.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a, computer-readable medium. Computer-readable media include both computer storage media and communication media including any medium that facilitates transfer of a computer program from one place to another. However, a computer readable storage medium is not a carrier wave, and may be any available media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.) It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." While various aspects and embodiments have been disclosed herein, other aspects and embodiments will be apparent to those skilled in the art. The various aspects and embodiments disclosed herein are for purposes of illustration and are not intended to be limiting.

Referring now to FIG. 1, an exemplary system 10 includes a consumer electronics (CE) device 12 that may be, e.g., a wireless telephone and second CE device 16 that in exemplary embodiments may be a television (TV) such as a high definition TV and/or Internet-enabled smart TV, but in any case both the CE devices 12 and 16 are understood to be configured to undertake present principles (e.g. communicate with each other to facilitate conferencing between two people as disclosed herein). Also shown is a server 18. Describing the first CE device 12 with more specificity, it includes a touch-enabled display 20, one or more speakers 22 for outputting audio such as audio from a conferencing application/service in accordance with present principles, and at least one additional input device 24 such as, e.g., an audio receiver/microphone for communicating over a conferencing application/service, and also for receiving voice commands and input. The CE device 12 also includes a network interface 26 for communication over at least one network 28 such as the Internet, an WAN, an LAN, etc. under control of a processor 30, it being understood that the processor 30 controls the CE device 12 including execution of a voice conferencing application/service in accordance with present principles. Furthermore, the network interface 26 may be, e.g., a wired or wireless modem or router, or other appropriate interface such as, e.g., a wireless telephony transceiver. In addition, the CE device 12 includes an input port 32 such as, e.g., a USB port, and a tangible computer readable storage medium 34 such as disk-based or solid state storage. In some embodiments, the CE device 12 may also include a GPS receiver 36 that is configured to receive geographic position information from at least one satellite and provide the information to the processor 30, though it is to be understood that another suitable position receiver other than a GPS receiver may be used in accordance with present principles.

Even further, in some embodiments the CE device 12 may include a mute switch 37 at least partially on and physically protruding from a housing portion of the CE device 12, the switch 37 understood to be electrically and/or communicatively connected to the processor 30 to provide input thereto. Note that the CE device 12 also includes a camera 14 that may be, e.g., a thermal imaging camera, a digital camera such as a webcam, and/or camera integrated into the CE device 12 and controllable by the processor 30 to gather pictures/images and/or video of viewers/users of the CE device 12 for, e.g., video conferencing. The CE device 12 may be, in non-limiting embodiments, a laptop computer, a desktop computer, a tablet computer, a mobile telephone, a smart phone (e.g., an Internet-enabled and touch-enabled mobile telephone), a PDA, a video game console, a video player, a personal video recorder, a smart watch, a music player, etc.

Now in reference to the CE device 16 which is the exemplary system 10 shown is understood to be a television (TV) such as e.g. an Internet-enabled smart TV, the CE device 16 includes a touch enabled display 38, one or more speakers 40 for outputting audio such as audio from a conferencing application/service in accordance with present principles, and at least one additional input device 42 such as, e.g., an audio receiver/microphone for communicating over the conferencing application/service, and also for receiving voice commands and input. The CE device 16 also includes a network interface 44 for communication over the network 28 under control of a processor 46, it being understood that the processor 46 controls the CE device 16 including execution of a voice conferencing application/service in accordance with present principles. The network interface 44 may be, e.g., a wired or wireless modem or router, or other appropriate interface such as, e.g., a wireless telephony transceiver. In addition, the CE device 16 includes an audio video interface 48 to communicate with other devices electrically/communicatively connected to the TV 16 such as, e.g., a set-top box, a DVD player, or a video game console over, e.g., an HDMI connection to thus provide audio video content to the CE device 16 for presentation thereon.

The CE device 16 further includes a tangible computer readable storage medium 50 such as disk-based or solid state storage, as well as a TV tuner 52. In some embodiments, the CE device 16 may also include a GPS receiver (though not shown) similar to the GPS receiver 36 in accordance with present principles. Further still, the CE device 16 may include a mute switch 54 at least partially on and physically protruding from a housing portion of the CE device 16, the switch 54 understood to be electrically and/or communicatively connected to the processor 46 to provide input thereto. Note that a camera 56 is also shown and may be, e.g., a thermal imaging camera, a digital camera such as a webcam, and/or camera integrated into the CE device 16 and controllable by the processor 46 to gather pictures/images and/or video of viewers/users of the CE device 16 for, e.g., video conferencing.

In addition to the foregoing, the CE device 16 also has a transmitter/receiver 58 for communicating with a remote commander (RC) 60 associated with the CE device 16 and configured to provide input (e.g., commands) to the CE device 16 to control the CE device 16. Accordingly, the RC 60 also has a transmitter/receiver 62 for communicating with the CE device 16 through the transmitter/receiver 58. The RC 60 also includes an input device 64 such as a keypad or touch screen display, as well as a processor 66 for controlling the RC 60 and a tangible computer readable storage medium 68 such as disk-based or solid state storage. Though not shown, in some embodiments the RC 60 may also include a touch-enabled display screen, a camera such as one of the cameras listed above, and a microphone that may all be used for conferencing in accordance with present principles. E.g., a user may engage in video conferencing with a conferee using a conferencing application/service operating in conjunction with the RC 60 and CE device 16 by providing input to a microphone on the RC 60 while a camera on the RC 60 gathers at least one image of the user, both of which are then transmitted to the CE device 16 by way of the transmitters/receivers 58 and 62, and in turn the CE device 16 transmits the audio and image data gathered at the RC 60 to another CE device associated with the conferee such as the CE device 12.

Still in reference to FIG. 1, reference is now made to the server 18. The server 18 includes at least one processor 70, at least one tangible computer readable storage medium 72 such as disk-based or solid state storage, and at least one network interface 74 that, under control of the processor 70, allows for communication with the CE devices 12 and 16 over the network 28 and indeed may facilitate communication therebetween. Note that the network interface 74 may be, e.g., a wired or wireless modem or router, or other appropriate interface such as, e.g., a wireless telephony transceiver. Accordingly, in some embodiments the server 18 may be an Internet server, may facilitate conferencing between CE device devices including both audio and audio/video conferencing, and may include and perform "cloud" functions such that the CE devices 12 and 16 may access a "cloud" environment via the server 18 in exemplary embodiments. Note that the processors 30, 46, 66, and 70 are configured to execute logic and/or software code in accordance with the principles set forth herein. Thus, for instance, the processor 30 is understood to be configured at least to execute the logic of FIG. 2 while the processor 70 is understood to be configured at least to execute the logic of FIG. 3.

Turning now to FIG. 2, an exemplary flowchart of logic to be executed by a CE device to execute a conferencing application and also receive commands while executing the conferencing application in accordance with present principles is shown. Before describing FIG. 2 with more specificity, however, it is to be understood that a conferencing application and/or conferencing service may be any application or service allowing at least audio conferencing between at least two individuals using respective CE devices, and in some instances may allow at least audio conferencing between three or more individuals in, e.g., a business-like or social setting where not all of the individuals are at the same physical location but nonetheless wish to conference among each other. Furthermore, it is to be understood that although audio conferencing may be specifically referenced herein, it is to be understood that present principles may also apply to audio video conferencing such as, e.g., "Skyping" with a plurality of people each using a different CE device to participate in the conference. As but another example, audio conferencing may include each respective individual calling in to a "call center," providing information required to engage in the desired conference call, and then being connected to other individuals by the call center to partake in conferencing.

Reference is now specifically made to the blocks of FIG. 2. Beginning at block 80, the logic begins executing video conferencing using a first audible input configuration by, e.g., executing a conferencing application of the CE device. The first audible input configuration is configured in exemplary embodiments for providing audio input to the CE device (e.g., a person's voice) that is received through e.g. a microphone over the conferencing application to a conferee that is also using a CE device and e.g. similarly executing a conferencing application to participate in the conference. After block 80 the logic proceeds to block 82 where a command is received while executing the conferencing application to change and/or switch audible input configurations to a second audible input configuration different from the first audible input configuration.

The command to change audible input configurations may be input to the CE device, e.g., at least partially responsive to configuration of a mute switch located on the CE device, such as the mute switch 37 described above. Nonetheless, in addition to or in lieu of configuring the mute switch, one or more of the following may also be input to the CE device to change audible input configurations: an audible command to change from the first audible input configuration to the second audible input configuration, and input directed to an audible input configuration selector element presented on the touch-enabled display.

The logic then moves to block 84 where the logic, responsive to the command and e.g. without any additional input from the user of the CE device after providing the command (e.g., manipulating a mute switch on the CE device), automatically changes audible input configurations to the second audible input configuration. In exemplary embodiments, the second audible input configuration is configured to not provide audio from the user to the other person using the conferencing application and instead receive at least one audible command from the user to execute a function on the CE device that is thus not provided over the conferencing application to the conferee.

Accordingly, after block 84 the logic receives the at least one command at block 86. The command may be to, e.g., gather and then present information on the CE device. For example, the command may be a request for information using an Internet search, a search of the CE device's storage medium based on key words to locate information/data containing or associated with the key words, and/or a request to present a particular document or file (e.g., a word processing document, a PDF document, a spreadsheet, meeting minutes from a previous meeting, an audio file, a picture or image, audio video content content etc.) stored on the CE device (and/or in a cloud storage area accessible to the CE device or otherwise accessible over a network). The one or more commands may further include, e.g., a command to initiate/launch another function or application of the CE device, such as a note taking application or feature that is configured to convert audio received by the CE device into text using, e.g., speech-to-text conversion software to thus record audio spoken by the user of the CE device in a note file/document using the note taking application.

Other examples of applications that can be initiated in the second audible configuration based on a command are, e.g., social networking applications, email applications (e.g. a user may provide audio that is converted into text to be included in an email to a recipient specified audibly by the user while in the second audible configuration), camera and/or picture taking applications, traffic alert and status applications (e.g. a user is driving while conferencing and wishes to see the traffic status of various freeways to determine which route to take while continuing to engage in the conference), news applications providing recent news stories, an application such as a marketplace which may be used to in turn download still other applications, a calendar application (e.g. a user's electronic calendar may be commanded to be presented on the CE device so that the calendar may be viewed and/or events may be added or deleted based on audible commands input while conferencing), chat/messaging applications (e.g. Google chat or AOL instant messenger to separately communicate with one of the conferees or some one else but not through the conference application), a music application (e.g., commanding the CE device to play background music while executing the conferencing application), a telephone feature of the CE device (e.g., so that a user may make a separate telephone call while conferencing), one or more settings features to change the settings of the conference application itself or other applications or features of the CE device, an electronic book reader application (e.g. the user may command an electronic book be presented on the CE device while executing the conferencing application), a map application (e.g. so that a user may acquire directions to a desired location while conferencing), a video application to present a video while conferencing, a game application to play a game while conferencing, an online retailer application to purchase goods or services while conferencing, a weather application to ascertain weather conditions while conferencing, a stocks application to ascertain the status of one or more stocks or a stock exchange while conferencing, a clock feature/application to e.g. determine the current time of day (or set an alarm or begin a stopwatch or countdown feature if e.g. each person engaged in the conference is only allowed a certain amount of time to speak before the next person's turn), etc.

Moreover, regardless of the particular information to be presented on the CE device based on a command from a user as set forth above, present principles recognize that e.g. at least while in the second audible input configuration the information that is presented to the user such as a word processing document or Internet search results may be audibly presented to the user in addition to being visually presented on a display of the CE device. This allows a user to receive the requested information without having to e.g. look at the CE device in situations where that may be inconvenient or unsafe such as while driving or jogging.

Still in reference to FIG. 2, after receiving the command at block 86 the logic proceeds to block 88 where the logic executes the command by, e.g., locating and presenting requested information and/or receiving audible input and converting the input to text to be included in electronic notes for the user. The logic then moves to block 90 where the logic may receive a command to change back to the first audible input configuration to thus engage in conferencing with the other conferees again, and accordingly at block 92 the logic changes back to the first audible input configuration.

Continuing the detailed description in reference to FIG. 3, an exemplary flowchart of logic to be executed by a server to facilitate conferencing and requests for information in accordance with present principles is shown. Beginning at block 94, the logic facilitates conferencing (e.g. Internet-based video conferencing), and then at block 96 the logic receives a user's request for information submitted to the server while the server facilitates the conferencing. Thus, in exemplary embodiments the server may be an Internet server capable of facilitating conferencing and also storing information accessible to the user e.g. through an Internet search. Accordingly, after receiving the request from the user at block 96 the logic gathers the requested information at block 98 and then provides the information to the CE device associated with the user at block 100.

FIGS. 4-9 are exemplary UIs presentable on a CE device while executing a conferencing application in accordance with present principles. Beginning first with FIG. 4, an exemplary UI 102 is shown, it being understood that the UI 102 may be a conferencing home screen for a conferencing application in accordance with present principles. The UI 102 includes text 104 on a central upper portion thereof indicating that the a video conference in particular is taking place. Thus, an image 106 of another conferee engaging in the conferencing with the user of the CE device presenting the UI 102 is shown, along with an indication 108 immediately beneath the image 106 that indicates the current length of the conference (e.g. total time elapsed) in at least minutes and seconds. Also shown on the UI 102 is an image 110 of the user of the CE device presenting the UI 102 that e.g. is gathered by a camera associated with the CE device. The image 110 is in an upper left portion of the UI 102 in the exemplary embodiment shown.

In addition, the UI 102 may optionally include one or more selector elements that are selectable to undertake certain functions while a user engages in a conference. For instance, a home selector 112 is selectable to return to a home screen of the CE device itself instead of presenting the UI 102, and an attach and send selector 114 is shown that may be selected to cause the CE device presenting the UI 102 to e.g. overlay a window on the UI 102 that allows a user to browse the storage medium of the CE device for a file which may then be provided to another conferee over the conferencing application and/or separately e.g. via email should an email account or function be associated with the conferencing application. A mute selector 116 is also shown that is selectable to mute any audio received by the CE device in that audio received the CE device while the mute function is activated will not be provided to the conferee(s) of the user over the conferencing application. Also if desired, a full screen selector 118 may be selected to cause the image 106 of the conferee to be presented in such a way as to occupy the entire display of the CE device such that all other portions of the UI 102 are no longer presented. Note that a volume selector 120 is also shown and may be selected to change volume output of the conferencing application, e.g. the output of a conferee's voice.

Figure 4:
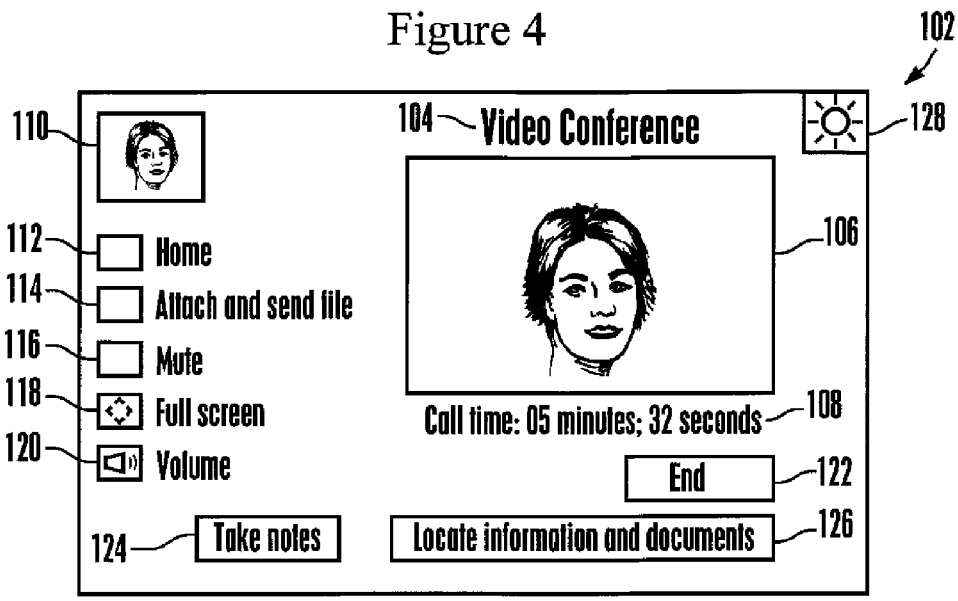

Still in reference to the UI 102 of FIG. 4, an end conference selector 122 is shown that may be selectable to end the conference being engaged in, and/or at least end the user's participation in the conference by disconnecting from the conference at the CE device. Furthermore, a take notes selector 124 is shown that may be selectable to cause a note taking feature to be executed while conferencing in accordance with present principles, as well as a locate information/documents selector 126 that may be selectable to locate information and/or documents for presentation on the CE device while conferencing in accordance with present principles. Last, note that a settings selector 128 may also be presented on an upper right portion of the UI 102 that is selectable to view and change settings associated with the conferencing application, as will be described in more detail in reference to FIG. 9.

Figure 5:
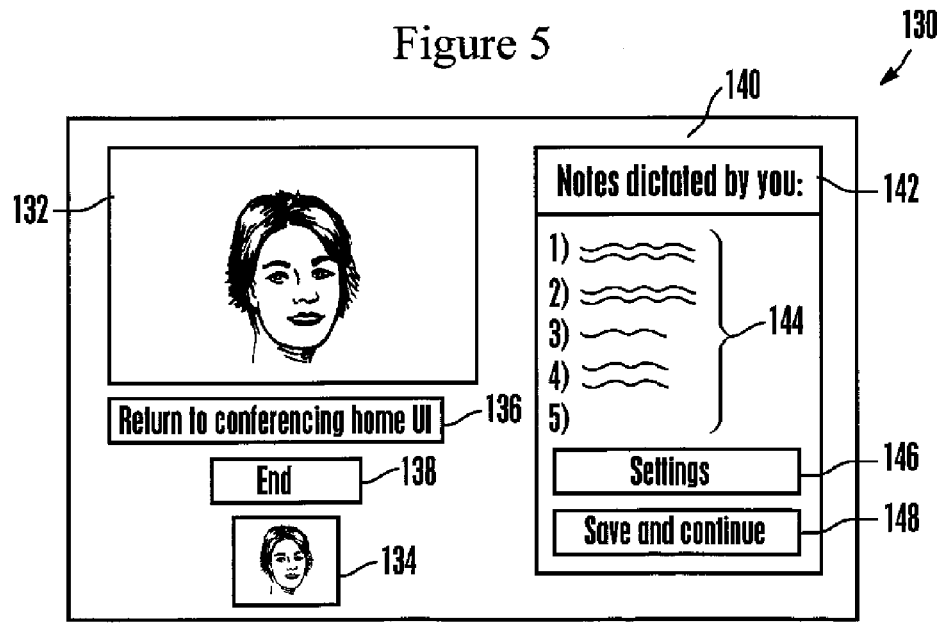

Before moving on to FIG. 5, however, it is to be understood that while FIG. 4 and indeed many the figures described herein are described in the context audio video conferencing, UIs with similar elements may be presented in the context of audio-only conferencing. For instance, should e.g. a CE device be used to call a conferencing call center to engage in conferencing through the call center with another conferee, the text 104, images 106 and 110, and full screen selector 118 may not be presented, but e.g. the home selector 112, attach and send file selector 114, mute selector 116, end conference selector 122, take notes selector 124, locate information/documents selector 126, and settings selector 128 may nonetheless still be presented on a UI for selection by a user in accordance with present principles. Accordingly, present principles recognize that the UIs described herein are exemplary and that other UIs in accordance with present principles may incorporate some but not all of the features and selectors described herein, and may also combine selectors and features from the various UN described herein.

Reference is now made to FIG. 5, which shows an exemplary UI 130 that may be automatically presented e.g. responsive to selection by a user of the selector 124 described above to thus cause the CE device on which the UI 130 is presented to undertake a note taking function while facilitating conferencing between the user and at least one conferee. Thus, the UI 130 includes an image 132 of the conferee and an image 134 of the user, though present principles recognize that the images 132 and 134 may not be presented if e.g. audio only conferencing is being facilitated but nonetheless at least some of the other selectors to be shortly described may still be presented.

Regardless, the UI 130 also includes a selector 136 that is selectable to cause e.g. to the UI 102 to be presented, and accordingly the selector 136 may include text indicating as much (e.g. "Select to Return to Conferencing Home UI"). An end conference selector 138 is also shown and may be similar in function and configuration to the end conference selector 122 described above. Also shown on the UI 130 is a note section 140 that e.g. reflects notes/information dictated by the user that has been converted to text by the CE device presenting the UI 130 and presented thereon. The section 140 includes a heading portion 142 indicating that the section 140 pertains to notes that have been created based on (e.g. the chronological order of) audio spoken by the user (e.g. while in the second audible input configuration described above). The section 140 also includes one or more separate note entries 144 that may be numbered e.g. in the order in which the entries 144 were dictated. The CE device may recognize that audio dictated by a user may constitute separate entries using e.g. artificial intelligence software to distinguish e.g. between topics, based on pauses between dictations from the user, based on commands from the user indicating that the dictation to follow is to be considered a separate note entry, etc.

In addition to the foregoing, the section 140 may also include a settings selector element 146 that is selectable to e.g. cause a note settings UI to be presented on the CE device to change settings associated with the note taking feature/application incorporated into the conferencing application and e.g. change the appearance of the section 140 (change the background and font colors, font type, text size, etc.). Other examples of note settings include a setting to take notes in a continuous entry/paragraph rather than creating separate entries as set forth above, whether notes are to be automatically without user input audibly presented back to the user after being received and converted to text by the CE device, how often to automatically save dictated notes, etc. Last, note that a save and continue selector element 148 is shown at the bottom of the section 140 and is understood to be selectable to cause notes to be saved so that they are not lost in the event of e.g. an unexpected power off of the CE device.

Now in reference to FIG. 6, an exemplary UI 150 for requesting information while conferencing is shown, it being understood that the UI 150 may be presented e.g. responsive to selection of the selector 126 described above. An image 152 of a conferee, an image 154 of the user of the CE device on which the UI 150 is presented, a home selector 156 selectable to cause e.g. to the UI 102 to be presented, and an end conference selector 158 are all shown, each of the elements 152, 154, 156, and 158 being similar in function and configuration respectively to e.g. the elements 106, 110, 136, and 138 described above.

As shown in FIG. 6, the UI 150 also includes an information request section 160 that may be presented and that includes e.g. text instructing the user to provide audible input regarding the desired information for the CE device to locate and present the information, and/or to enter the information using another input device. For example, audible input received by the CE device may be converted to text and entered to a text entry box 162 in real time as the audible input is received. Further still, touch input from a user may be directed to the portion of the CE device display presenting the text entry box 162 to thereby cause a virtual keyboard to be overlaid onto at least a portion of the UI 150 for a user to manipulate to enter a request for information. Furthermore, the UI 150 may in some embodiments be presented automatically without further input from a user after providing input to change to the second audible input configuration, and indeed the same applies to the UI 130 as well.

In addition, beneath the text entry box 162 are plural options 164 to narrow a desired request for information to a particular class or category of information and/or storage locations. For instance, the request for information may be limited to information available via Internet searching, limited to documents residing locally on a storage medium of the CE device presenting the UI 150, and/or limited to documents stored somewhere other than the storage medium of the CE device such as e.g. cloud storage or another storage medium accessible over a network to which the CE device is connected or may be connected. An enter selector 166 is also shown that is selectable to cause the requested information to be located and presented, though it is to be understood that an audible command may also direct the conferencing application to locate and present the information. Last, the exemplary UI 150 may also include a display full screen selector 168 that is selectable to cause the information request section 160 to be displayed in a visually enlarged configuration such that only the section 160 is presented (e.g., the elements 152, 154, 156, and 158 not being presented).

Now describing FIG. 7, an exemplary UI 170 for presenting search results of requested information while conferencing is shown, it being understood that the UI 170 may be presented e.g. responsive to a request for information as described herein. An image 172 of a conferee, an image 174 of the user of the CE device on which the UI 170 is presented, a home selector 176 selectable to cause e.g. to the UI 102 to be presented, and an end conference selector 178 are all shown, each of the elements 172, 174, 176, and 178 being similar in function and configuration respectively to e.g. the elements 106, 110, 136, and 138 described above.

As shown in FIG. 7, the UI 170 also includes a requested information presentation section 180 including text 182 indicating that what is presented in the section 180 is information that has been requested. The information may be organized by the conferencing application into separate entries 182 if more than one e.g. search result satisfies the user's request. Beneath the entries 182 is an instruction 184 indicating that the entries are selectable (e.g. based on touch input directed thereto and/or voice commands) to display the source page from which the information aggregated to the section 180 was derived. Note that the information presented in the section 180 may, e.g. at the request of the user, be audibly presented to the user. Last, note that the UI 170 may also include a display full screen selector 186 that is selectable to cause the information presentation section 180 to be displayed in a visually enlarged configuration such that only the section 180 is presented (e.g., the elements 172, 174, 176, and 178 not being presented).

Figure 8:
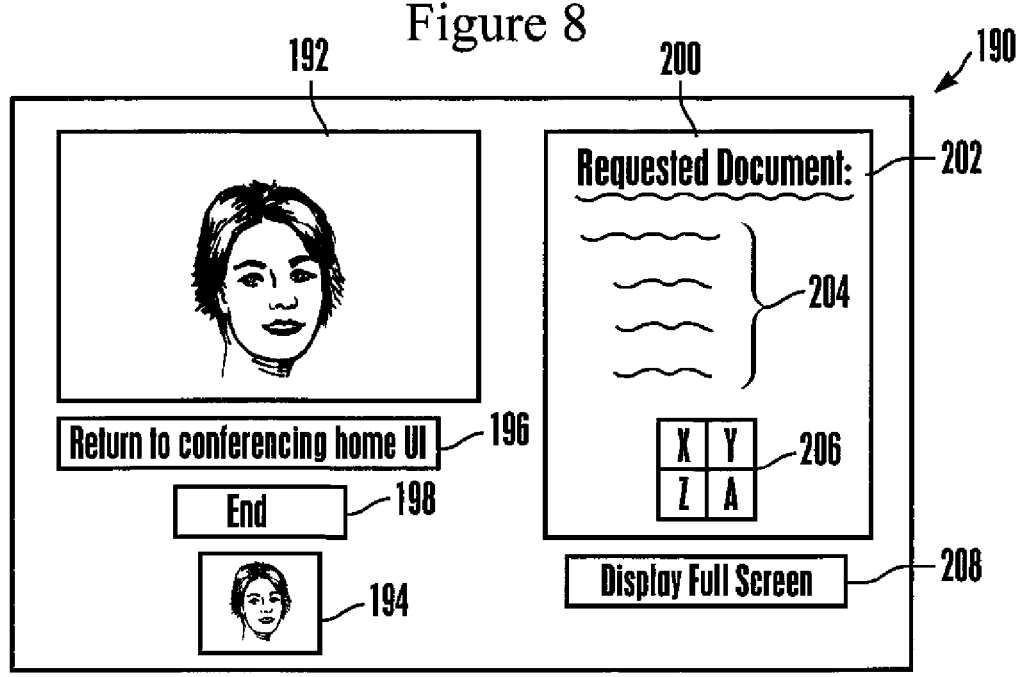

Continuing the detailed description in reference to FIG. 8, an exemplary UI 190 for presenting a requested document while conferencing is shown, it being understood that the UI 190 may be presented e.g. responsive to a request for a document as described herein. Thus, the UI 190 includes an image 192 of a conferee, an image 194 of the user of the CE device on which the UI 190 is presented, a home selector 196 selectable to cause e.g. to the UI 102 to be presented, and an end conference selector 198, each of the elements 192, 194, 196, and 198 being similar in function and configuration respectively to e.g. the elements 106, 110, 136, and 138 described above.

As shown in FIG. 8, the UI 190 also includes a document presentation section 200 including text 202 indicating that what is presented therein pertains to the document request submitted by the user (e.g., an audible command/request for one or more documents). Beneath the text 202 may be, e.g., a screen shot of the requested document, the text contained in the document that has been extracted from the document, or a presentation of the document itself such that it may be e.g. manipulated, scrolled, edited to include further text or to delete text, etc. In the present instance shown on the UI 190, extracted text 204 is shown along with an exemplary chart or image 206 that may have also been included in or otherwise associated with the requested document.

Furthermore, note that the information presented in the section 200 may, e.g. at the request of the user, be audibly presented to the user. Last, note that the UI 190 may also include a display full screen selector 208 that is selectable to cause the section 200 to be displayed in a visually enlarged configuration such that only the section 200 is presented (e.g., the elements 192, 194, 196, and 198 not being presented).

Figure 9:
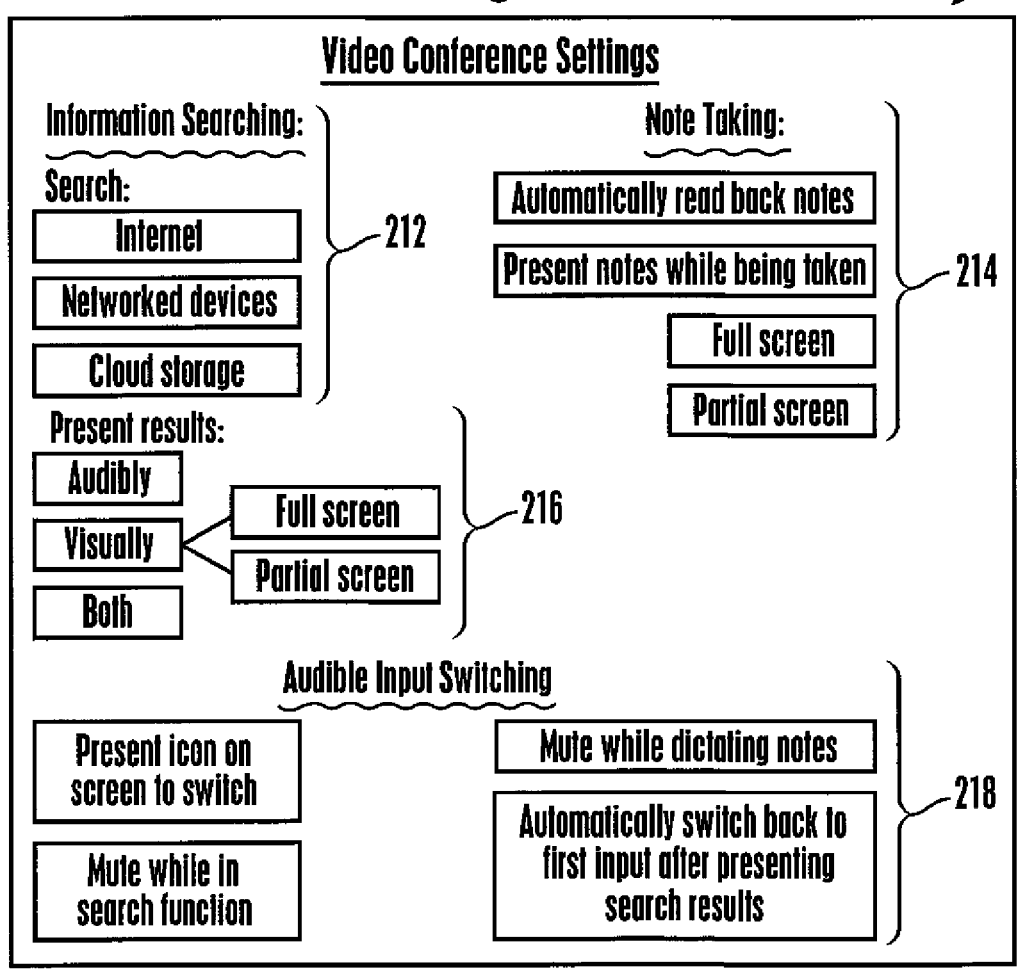

Concluding the detailed description in reference to FIG. 9, an exemplary conferencing settings UI 210 is shown, it being understood that the UI 210 may be presented responsive to either or both e.g. an audible command to display the UI 210 and/or selection of the settings selector 128 from the UI 102. Regardless, plural conferencing settings are shown, including an information searching setting option 212 providing one or more selectors that may be selected to cause searches for requested information to be automatically executed e.g. over the Internet, on networked devices (e.g. their storage mediums), and/or on cloud storage based on configuration of the setting. Note that more than one of these options may be selected at any one time so that e.g. a single search for information using one or more key words may be executed by searching both the Internet and cloud storage to present results from both. A note taking option 214 is also shown that includes various selectors that are selectable to invoke options related to the note taking functions described herein such as automatically reading back notes once received audibly and converted to text, visually presenting notes in real time as the notes are being dictated, and automatically presenting the notes in a full screen mode or partial screen mode such as e.g. described in reference to FIG. 5 above.

In addition to the foregoing, the settings UI 210 also may also include search results presentation options 216 including plural selectors for a user to choose how search results/requested documents should be presented, including audibly, visually, or both, and even further when presented choices may be provided for doing so in a full or partial screen mode. Furthermore, the UI 210 may include audible input switching settings 218 that relate to changing audible input configurations as described herein. For instance, the settings 218 may include selectors that are selectable to cause e.g. a selectable icon to be presented on a UI such as the home UI 102 to change audible input configurations, a selector selectable to cause "muting" of the user while dictating notes such that audio from the user is not provided to a conferee over the conferencing application as described herein, a selector selectable to cause muting of the user while the user provides commands to search for information/documents such that audio form the user is not provided to a conferee over the conferencing application, and/or a selector selectable to set the conferencing application to automatically change back to the first audible input configuration (e.g. for a user to communicate with a conferee audibly over the conferencing application) after search results and/or requested information/documents are presented to the user as set forth herein.

Accordingly, it may now be appreciated that a user of a CE device executing a conferencing application may access information, documents, take notes, etc. while participating in a conference including e.g. at least two or three conferees, and indeed this may enhance the conferencing experience by providing the user with access to information useful while conferencing and/or pertinent to the topic of the conference. Furthermore, it is to be understood that any of the information, text, documents, notes, etc. (and even the availability of the selectors described herein) can be audibly communicated to a user in accordance with present principles so that the user may receive the information, text, documents, notes, etc. audibly when viewing the CE device itself may not necessarily be convenient. Likewise, any of the selectors, text entry boxes, etc. described above may be audibly selected/manipulated by a user through audible commands input to the CE device/conferencing application, it being understood that they may also be selected based on touch input directed to a portion of the CE device's display presenting the selectors, boxes, etc.

Moreover, present principles recognize that artificial intelligence (AI) systems may be used in conjunction with the conferencing systems/applications disclosed herein. These AI systems may be separate form the conferencing systems/applications but nonetheless accessible by the conferencing systems/applications for use thereby, and/or may be incorporated into the conferencing systems/applications themselves. Also, these AI systems are understood to thus be capable of performing speech to text and text to speech (using e.g. an AI voice) in accordance with present principles, and thus are capable of recognizing natural language spoken by a user and to take action accordingly e.g. should the natural language include a command to the AI system and/or conferencing application/system. The AI system and/or conferencing application/system may thus act as a virtual assistant to a user while engaged in conferencing. Thus, commands and/or requests may be input after manipulating a mute button on the CE device to change audible input configurations to thus redirect input to a CE device microphone to a local (relative to the CE device) voice operated AI system that can understand natural language, and perform keyword searches on data on local storage device and/or over a network, can perform text-to-speech conversion on the found data, and can also assist with the note taking features described herein, all the while maintaining an active conferencing session.

In addition to the foregoing, present principles recognize that still other features/aspects of the conferencing described herein may be used in conjunction with present principles. For instance, two users may be using a single CE device to conference with at least one other person using a conferencing application/service. In such instances, the CE device (e.g., including an AI module) is able to recognize and distinguish between the voices of each of the two users. In such instances, commands may only be executed based on audible input from one user or the other if conferencing settings have been configured to only execute commands, requests for information, etc. from one of the users specified in the settings but not the other. What's more, the CE device is understood to be able to distinguish between audio from a user engaging in conferencing and background audio if e.g. the CE device is disposed in a public place to thereby avoid undesired commands and audible input from being input to the CE device and/or communicated to conferees.

Even further, though not described in reference to any particular figure, present principles recognize that rather than configuring a switch to change audible input configurations, a voice command to change configurations or a keyword recognizable by the CE device for such purposes may be used. Even further, the AI principles discussed herein allow for a user to in some instances not even provide such a voice command, the AI instead recognizing a portion of audible input it receives as a command/request for information rather than audio meant to be conveyed to a conferee and thus simply executes the command without providing it to the conferee and without specifically changing between audible input configurations as described above, and in this respect the AI may filter all audio input to determine whether to provide it to the conferee of the user or instead execute a command, search, etc.

Furthermore, the AI described herein may keep the communication context (e.g. in conjunction with voice-based natural language recognition). Thus, each commanding sentence may not necessarily be individually processed but processed within the (e.g. larger) current context (e.g. of what is being spoken). This allows proper process commanding of sentences such as e.g. "repeat the last sentence" and "what is the largest value in the first column in the July table?"

Present principles also recognize that the CE devices disclosed herein are portable and may use a mobile phone network for communication, thus providing on-the-go usage of present principles.

While the particular PROVIDING INFORMATION TO USER DURING VIDEO CONFERENCE is herein shown and described in detail, it is to be understood that the subject matter which is encompassed by the present invention is limited only by the claims.

What is claimed is:

1. A device, comprising:
at least one computer readable storage medium that is not a transitory signal and that includes instructions which when executed by a processor cause the processor to:
execute a conferencing application on a CE device, wherein the conferencing application is configured for a user of the conferencing application to at least audibly communicate with at least one other person using the conferencing application at least through a first audible input configuration, the first audible input configuration configured for providing audio from the user to the other person using the conferencing application;
receive at least one audible command at the CE device, the audible command causing the processor to initiate a note taking feature of the CE device, the note taking feature configured for converting audio to text for viewing the text on a display of the CE device;

present at least one user interface (UI) on the display of the CE device, the UI including:

a note taking option with at least one selector selectable to invoke at least one option related to taking notes based on audible signals through a microphone of the CE device, the UI including a read back selector selectable to cause the CE device to automatically read back notes once received audibly and converted to text.

2. The device of claim 1, wherein the instructions cause the processor to receive, over a second audible input configuration, the at least one audible command at the CE device, the audible command causing the processor to access information and provide the information to the user.

3. The device of claim 2, wherein the information at least includes textual information, and subsequent to receiving the command the information is provided audibly on the CE device using text to speech conversion software.

4. The device of claim 2, wherein subsequent to receiving the command, the information is provided audibly and visually on the CE device.

5. The device claim 1, wherein the audible input configuration command is received at least based on configuration of a physical switch located on the CE device.

6. The device claim 1, wherein the audible input configuration command is received at least based on receipt of an audible command to change from the first audible input configuration to a second audible input configuration.

7. The device of claim 1, wherein the display is a touch-enabled display, and wherein the audible input configuration command is received at least based on input directed to an audible input configuration selector element presented on the display.

8. The device of claim 1, comprising the processor and the display.

9. The device of claim 1, wherein the conferencing application is a video conferencing application that is configured to visually present an image of the at least one other person on the CE device at least while the information is provided to the user, and/or at least while the note taking feature converts the audio from the user received over a second audible input configuration to text for viewing on the display.

10. The device of claim 1, wherein the instructions when executed by the processor configure the processor to:

at least while executing the conferencing application, receive an audible input configuration command to change from the first audible input configuration to a second audible input configuration, the second audible input configuration configured to not provide audio from the user to the other person using the conferencing application, the second audible input configuration configured for receiving audible CE device commands from the user.

11. A method, comprising:

executing a conferencing application on a consumer electronics (CE) device; and in response to an audible command received at the CE device while the conferencing application is executing, presenting information on the CE device, the information requested at least partially based on the audible command;

presenting at least one user interface (UI) on a display of the CE device, the UI including:

an information searching setting option providing one or more selectors selectable to cause searches for requested information to be automatically executed;

a note taking option with at least one selector selectable to invoke at least one option related to taking notes based on audible signals through a microphone of the CE device from a user of the CE device, including a read back selector selectable to cause the CE device to automatically read back notes once received audibly and converted to text, and/or including a presentation selector selectable to cause the CE device to visually present notes as the notes are being dictated.

12. The Method of claim 11, wherein the CE device is configured to recognize the command as a request for information, the CE device not providing the command using the conferencing application to another person engaged in conferencing with the user.

13. The method of claim 11, wherein the command is first command, the first command being preceded by second command to change an audible input configuration of the CE device, the change in the audible input configuration configuring the CE device to receive the first command and not provide the first command to another person engaged in conferencing with the use over the conferencing application.

14. The method of claim 11, wherein the CE device includes a computer readable storage medium, the computer readable storage medium storing the information presented on the CE device.

15. The method of claim 11, wherein the CE device is configured to communicate over a network, the information presented on the CE device being accessible by the CE device over the network.

16. A computer readable storage medium that is not a transitory signal, the computer readable storage medium having instructions which when executed by a processor of a consumer electronics (CE) device configure the processor for:

executing a conferencing service on the CE device, the conferencing service configured at least for facilitating audio conferencing between a user of the CE device and at least one conferee;

receiving a first command at the CE device while the conferencing service is executing and, in response to receiving the first command, changing audible input configurations of the CE device from a first audible input configuration to a second audible input configuration, the first audible input configuration at least configured for providing audio from the user to the conferee over the conference service, the second audible input configuration at least configured for receiving requests for information, the second audible input configuration configured to prohibit audio from the user from being provided to the conferee;

receiving a second command at the CE device while the conferencing service is executing and, in response to receiving the second command, changing audible input configurations from the second audible input configuration to the first audible input configuration;

presenting at least one user interlace (UI) on a display of the CE device, the UI including:

an information searching setting option providing one or more selectors selectable to cause searches for requested information to be automatically executed;

a note taking option with at least one selector selectable to invoke at least one option related to taking notes based on audible signals through a microphone of the CE device from a user of the CE device, including a read back selector selectable to cause the CE device to automatically read back notes once received audibly and converted to text, and/or including a presentation selector selectable to cause the CE device to visually present notes as the notes are being dictated.

17. The computer readable storage medium of claim 16, wherein the note taking option with at least one selector selectable to invoke at least one option related to taking notes based on audible signals through a microphone of the CE device from a user of the CE device includes a read back selector selectable to cause the CE device to automatically read back notes once received audibly and converted to text.

18. The computer readable storage medium of claim 17, wherein the note taking option with at least one selector selectable to invoke at least one option related to taking notes based on audible signals through a microphone of the CE device from a user of the CE device includes a presentation selector selectable to cause the CE device to visually present notes as the notes are being dictated.

19. The computer readable storage medium of claim 16, wherein the conferencing service is a video conferencing service that is configured to visually present an image of the conferee on a display of the CE device and to present audio from the conferee on at least one speaker of the CE device.

20. The computer readable storage medium of claim 16, wherein the first and second commands are received at least partially based on manipulation of a physical audible input configuration switch located on the CE device.

\* \* \* \* \*